(12) United States Patent
Sim

(10) Patent No.: US 8,342,586 B2
(45) Date of Patent: Jan. 1, 2013

(54) ROBOT HAND AND HUMANOID ROBOT HAVING THE SAME

(75) Inventor: Hyun Sik Sim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 682 days.

(21) Appl. No.: 12/461,677

(22) Filed: Aug. 20, 2009

(65) Prior Publication Data

US 2010/0061835 A1    Mar. 11, 2010

(30) Foreign Application Priority Data

Sep. 11, 2008    (KR) .................. 10-2008-0089837

(51) Int. Cl.
    *B25J 15/10* (2006.01)
(52) U.S. Cl. ............. 294/106; 294/111; 901/13; 901/36
(58) Field of Classification Search .................. 294/106, 294/111; 623/57, 63, 64; 901/32, 39, 36, 901/13, 31; 414/7
See application file for complete search history.

(56) References Cited

U.S. PATENT DOCUMENTS

| | | | | | |
|---|---|---|---|---|---|
| 4,865,376 | A | * | 9/1989 | Leaver et al. | 294/111 |
| 4,921,293 | A | * | 5/1990 | Ruoff et al. | 294/111 |
| 5,062,673 | A | * | 11/1991 | Mimura | 294/111 |
| 5,080,682 | A | * | 1/1992 | Schectman | 623/64 |
| 5,200,679 | A | * | 4/1993 | Graham | 294/111 |
| 5,447,403 | A | * | 9/1995 | Engler, Jr. | 901/39 |
| 5,570,920 | A | * | 11/1996 | Crisman et al. | 294/111 |
| 7,407,208 | B2 | * | 8/2008 | Tadano | 294/111 |
| 2006/0033462 | A1 | * | 2/2006 | Moridaira | 318/568.12 |
| 2009/0302626 | A1 | * | 12/2009 | Dollar et al. | 294/106 |
| 2010/0176615 | A1 | * | 7/2010 | Okuda et al. | 294/106 |

FOREIGN PATENT DOCUMENTS

| | | |
|---|---|---|
| JP | 11-267987 | 10/1999 |
| JP | 2004-130405 | 4/2004 |
| KR | 10-2001-0086432 A | 9/2001 |

* cited by examiner

*Primary Examiner* — Paul T Chin
(74) *Attorney, Agent, or Firm* — Staas & Halsey LLP

(57) ABSTRACT

A robot hand, which minimizes the number of actuators and adjusts the bending angles of joints through torque limiters to flexibly and finely control finger units, and a humanoid robot having the robot hand. The robot hand includes a torque limiter disposed on at least any one joint of a plurality of joints to link another joint of the plurality of joints with the any one joint through a power transmission member.

15 Claims, 6 Drawing Sheets

ROBOT HAND AND HUMANOID ROBOT HAVING THE SAME

CROSS-REFERENCE TO RELATED APPLICATIONS

This application claims the benefit of Korean Patent Application No. 2008-0089837, filed on Sep. 11, 2008, in the Korean Intellectual Property Office, the disclosure of which is incorporated herein by reference.

BACKGROUND

1. Field

The disclosure relates to a robot hand and a humanoid robot having the same. More particularly, the disclosure relates to a robot hand, which safely and exactly grips various target objects, and a humanoid robot having the robot hand.

2. Description of the Related Art

In general, robots are machines, which automatically perform any work or manipulation, and replace or aid humans in various fields. Among the robots, industrial robots have the highest utility. The industrial robots achieve automation and unmanned operation of a production line to enhance productivity, and perform dangerous work instead of humans, thus contributing to protecting humans from industrial disasters.

Recently, humanoid robots, which have a similar external appearance to that of humans and perform a similar movement to that of humans, have been developed. The humanoid robots commit to various industrial fields and are used to perform various works, which are hard for humans, in the same manner as the general industrial robots. The best advantage of the humanoid robots is that the humanoid robots exist together with humans in daily life and provide various services friendly to humans rather than replace humans. Thus, in order to allow the humanoid robots to smoothly cooperate with humans in daily life, researches in a robot hand, which safely and exactly grips various objects, have been vigorously developed.

SUMMARY

Therefore, one aspect of the present invention is to provide a robot hand, which adjusts the bending angles of joints through torque limiters so as to achieve the fine control of finger units, and a humanoid robot having the robot hand.

In accordance with one aspect, the present invention provides a robot hand including a base unit provided with an actuator; at least one finger unit installed on the base unit; a plurality of link members provided in each of the at least one finger unit; a plurality of joints connecting the plurality of link members; a plurality of power transmission members linking the plurality of joints with each other by power transmitted from the actuator; and a torque limiter disposed on any one joint of the plurality of joints, and restricting the bending of the any one joint to link another joint of the plurality of joints with the any one joint.

Additional aspects and/or advantages will be set forth in part in the description which follows and, in part, will be apparent from the description, or may be learned by practice of the invention.

The plurality of link members may include a first link member connected to the base unit, a second link member connected to the first link member, and a third link member connected to the second link member, and the torque limiter may include a housing fixed to the first link member to adjust the bending angle of the any one joint.

A plurality of grooves may be formed on the outer circumferential surface of the housing, and a plurality of ribs engaged with the plurality of grooves may be formed on the inner circumferential surface of the first link member to prevent the relative rotation of the first link member against the housing.

The plurality of joints may include a first joint connecting the base unit and the first link member, a second joint connecting the first link member and the second link member, and a third joint connecting the second link member and the third link member; and the first, second, and third joints may respectively include first, second, and third pulleys, and are linked with the actuator.

The torque limiter may include a rotary shaft disposed coaxially with the first pulley.

The plurality of power transmission members may include a first power transmission member connecting the first pulley and the second pulley, and a second power transmission member connecting the second pulley and the third pulley; and the first power transmission member and the second power transmission member may be wound in different directions.

The second power transmission member may be wound in an X shape between the second and third pulleys.

The first and second power transmission members may respectively include first and second belts.

When an object contacts the first link member and applies reaction force of a designated value or more to the first link member, the torque limiter may be operated and thus the first link member may be stopped, the rotary shaft may be rotated in a slippage state with the housing and thus the first pulley may be rotated, the second pulley and the second link member may be rotated in the linkage with the rotation of the first pulley and thus the bending angle of the second joint may be varied, and the third pulley and the third link member may be rotated in the linkage with the rotation of the second link member and thus the bending angle of the third joint may be varied.

In accordance with another aspect, the present invention provides a humanoid robot, which has a torso; and a robot hand connected to the torso, the robot hand including a base unit provided with an actuator; at least one finger unit installed on the base unit; a first link member, a second link member, and a third link member respectively provided in each of the at least one finger unit; a first joint connecting the base unit and the first link member; a second joint connecting the first link member and the second link member; a third joint connecting the second link member and the third link member; a first pulley provided on the first joint and receiving power of the actuator; second pulleys provided on the second joint and connected to the first pulley; a third pulley provided on the third joint and connected to the second pulleys; a plurality of power transmission members linking the first, second, and third joints with each other by the power of the actuator; and a torque limiter disposed on the first joint, and restricting the bending of the first joint to rotate the second and third pulleys and thus to vary the bending angles of the second and third joints, when the torque limiter contacts an object and reaction force of a designated value or more is applied to the torque limiter.

An actuator may be provided on each of the at least one finger units.

BRIEF DESCRIPTION OF THE DRAWINGS

These and/or other aspects and advantages of the invention will become apparent and more readily appreciated from the following description of the embodiments, taken in conjunction with the accompanying drawings in which.

DETAILED DESCRIPTION OF EMBODIMENTS

Figure 1:
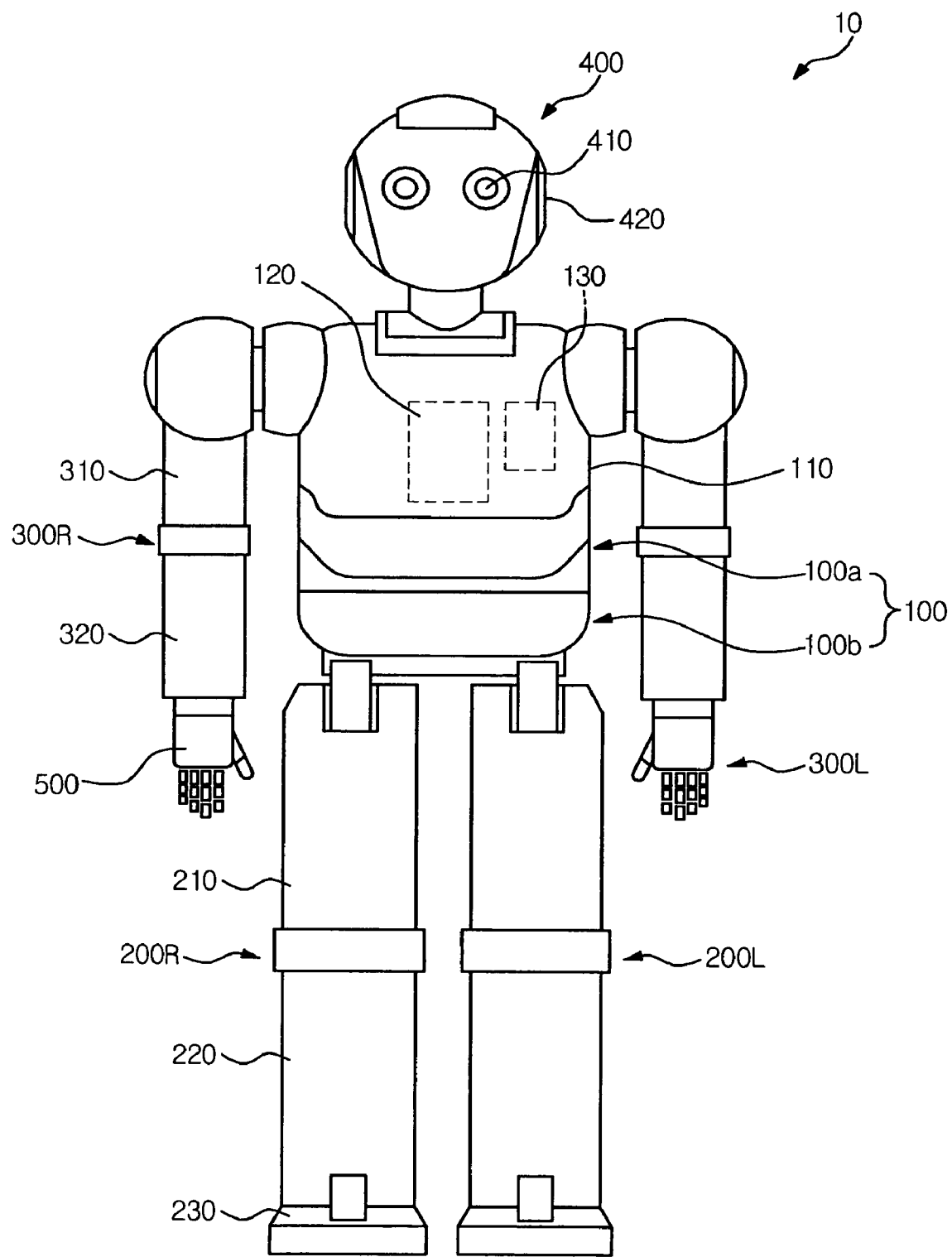
FIG. 1 is a schematic view illustrating a humanoid robot in accordance with an embodiment.

Reference will now be made in detail to the embodiments of the present invention, an example of which is illustrated in the accompanying drawings, wherein like reference numerals refer to like elements throughout. The embodiments are described below to explain the present invention by referring to the annexed drawings.

FIG. 1 is a schematic view illustrating a humanoid robot in accordance with the present invention.

As shown in FIG. 1, a humanoid root 10 includes a torso 100, two legs 200R and 200L connected to both sides of the lower portion of the torso 100, two arms 300R and 300L connected to both sides of the upper portion of the torso 100, and a head 400 connected to the upper end of the torso 100. Here, R represents the right side of the robot 10, and L represents the left side of the robot 10.

The inside of the torso 100 is protected by a cover 110. A control unit 120, a battery 130, and an inclination sensor (not shown) are installed in the torso 10. The inclination sensor detects an inclination angle of the torso 100 against a vertical axis and its angular velocity. The torso 100 is divided into a breast 100a and a waist 100b, and a joint to rotate the breast 100a relative to the waist 100b is installed between the breast 100a and the waist 100b.

The legs 200R and 200L are provided at both sides of the lower portion of the torso 100, and respectively include thigh links 210, calf links 220, and feet 230. The thigh links 210 are respectively connected to the torso 100 through thigh joint units (not shown). The thigh links 210 and the calf links 220 are respectively connected to each other through knee joint units (not shown), and the calf links 220 and the feet 230 are respectively connected to each other through ankle joint units (not shown).

The head 400 is provided at the upper end of the torso 100. Cameras 410 serving as eyes of the robot 10 and microphones 420 serving as ears of the robot 10 may be installed in the head 400. The head 400 is connected to the torso 100 through a neck joint unit (not shown).

The arms 300R and 300L are provided at both sides of the upper portion of the torso 100, and respectively include upper arm links 310 and lower arm links 320. The upper arm links 310 are respectively connected to the torso 100 through shoulder joint units (not shown). The upper arm links 310 and the lower arm links 320 are respectively connected to each other through elbow joint units (not shown). Further, the arms 300R and 300L respectively include robot hands 500. Here, the robot hands 500 are respectively connected to the lower arm links 320. Both robot hands 500 have the same configuration, and thus only the right robot hand 500 will be described hereinafter.

Figure 2:
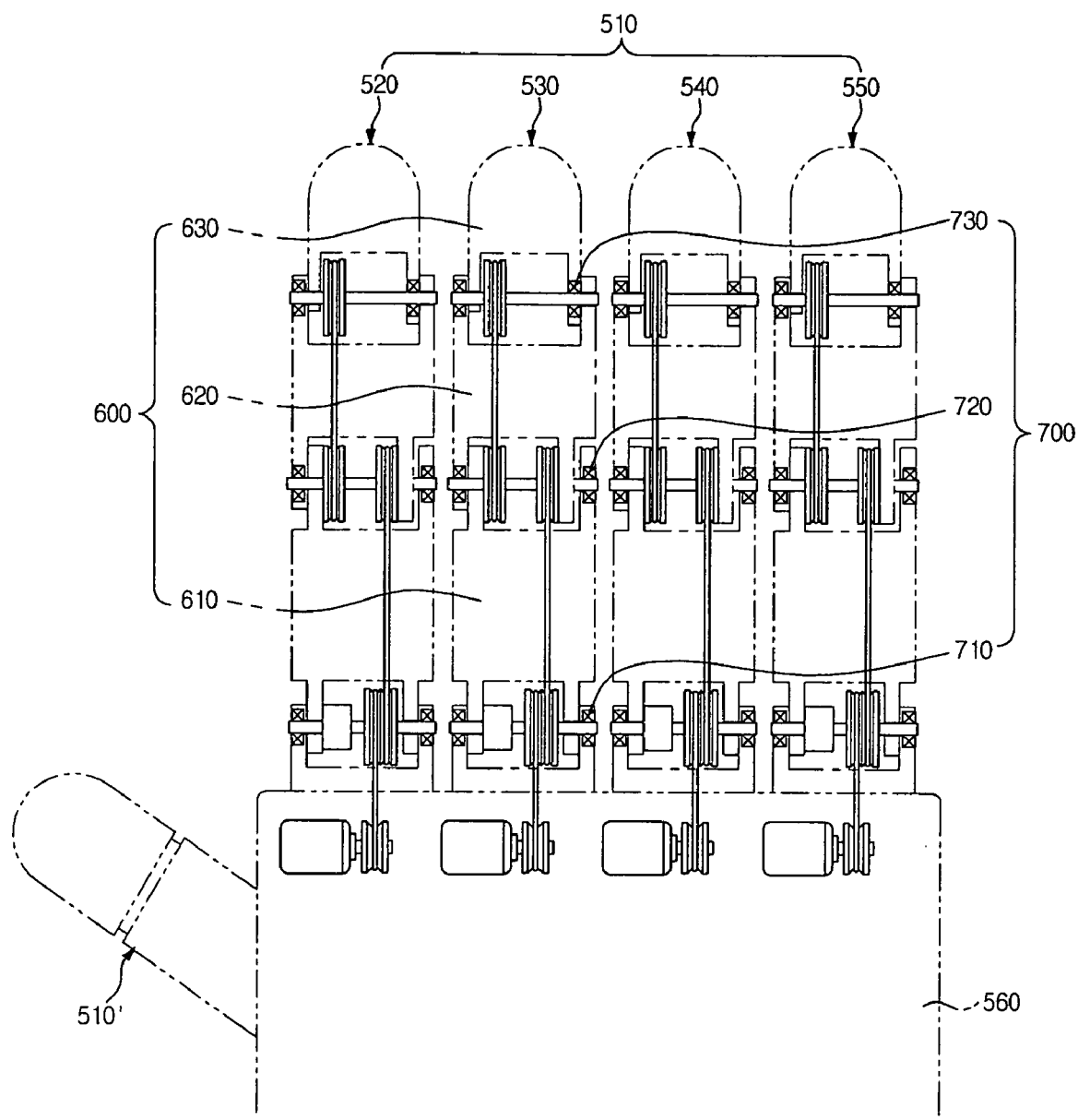
FIG. 2 is a view illustrating a robot hand of the humanoid robot in accordance with the embodiment.

FIG. 2 is a view illustrating the right robot hand of the humanoid robot in accordance with the embodiment.

As shown in FIG. 2, the robot hand 500 in accordance with the embodiment includes a base unit 560, and a finger unit assembly 510' and 510.

The base unit 560 corresponds to a portion of a human hand, i.e., a palm or a back. The base unit 560 includes a palm part having a case shape corresponding to the palm of the human hand, and a back part having a case shape corresponding to the back of the human hand.

The finger unit assembly 510' and 510 includes a thumb unit 510' and plural finger units 510.

The thumb unit 510' is extended in a direction differing from that of the plural finger units 510. The thumb unit 510' is driven by a motor (not shown).

The plural finger units 510 are extended from the edge of one end of the base unit 560 in the approximately same direction. The plural finger units 510 include four finger units 520, 530, 540, and 550. The respective finger units 510 are modeled on the movement of human fingers.

That is, the finger unit 520 corresponds to a human forefinger, the finger unit 530 corresponds to a human middle finger, the finger unit 540 corresponds to a human ring finger, and the finger unit 550 corresponds to a human little finger. Hereinafter, only the finger unit 530 corresponding to the human middle finger will be described, and a description of other finger units 520, 540, and 550, which have the same structure as that of the finger unit 530 except for the size, will be omitted.

Figure 3:
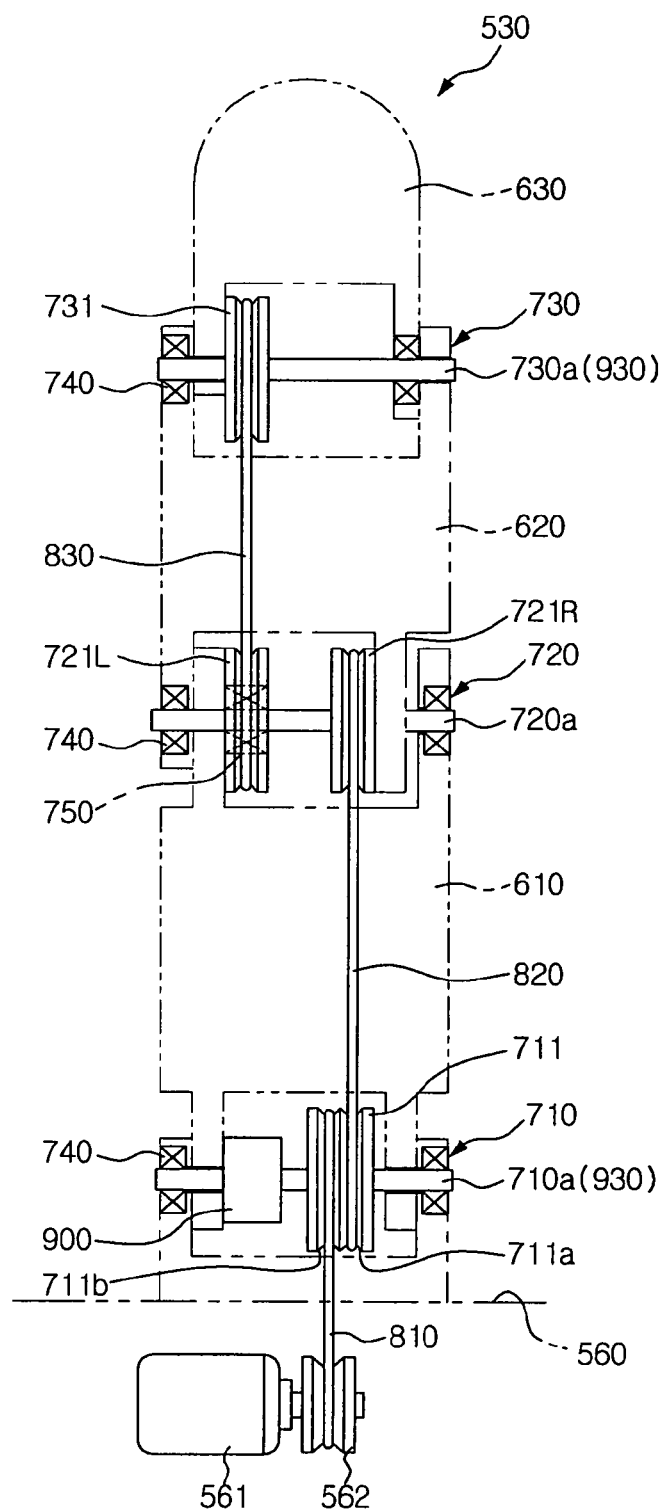
FIG. 3 is an enlarged view of a portion of FIG. 2.

FIG. 3 is a view illustrating the finger unit 530 corresponding to the human middle finger.

As shown in FIG. 3, the finger unit 530 includes a plurality of link members 600, and a plurality of joints 700 to connect the plurality of link members 600.

The plurality of joints 700 of the finger unit 530 in accordance with the present invention includes a first joint 710, a second joint 720, and a third joint 730, which are sequentially close to the base unit 560. Further, the plurality of link members 600 includes a first link member 610, a second link member 620, and a third link member 630, which are sequentially close to the base unit 560.

The first joint 710 is a joint, which is closest to the base unit 560. The first link member 610 is connected to the base unit 560 using the first joint 710.

The first link member 610 is provided with one end connected to the first joint 710 and the other end connected to the second link member 620. The first link member 610 is provided with both rectangular ends formed in a semicircle such that one end of the first link member 610 is rotatably connected to a first joint shaft 710a and the other end of the first link member 610 is connected to the second link member 620 through the second joint 720.

The first joint 710 is freely bent, and the bending angle of the first joint 710 is varied according to the bending of the first joint 710 around the first joint shaft 710a.

A first pulley 711 and a torque limiter 900 are connected to the first joint shaft 710a. Thus, the bending angle of the first joint 710 is varied by the first pulley 711 and the torque limiter 900.

The first pulley 711 is provided with two pulley grooves 711a and 711b formed on the outer circumferential surface thereof. A first power transmission member 820 connected to a second pulley 721R is wound on one pulley groove 711b out of the two pulley grooves 711a and 711b, and a main power transmission member 810 connected to a driving pulley 562 is wound on the other one pulley groove 711a out of the two pulley grooves 711a and 711b. Here, the driving pulley 562 is rotatably fixed to an actuator 561 installed in the base unit 560 adjacent to the first link member 610. The driving pulley 562 is connected to the first pulley 711 of the first joint 710, and transmits the power of the actuator 561.

Figure 4:
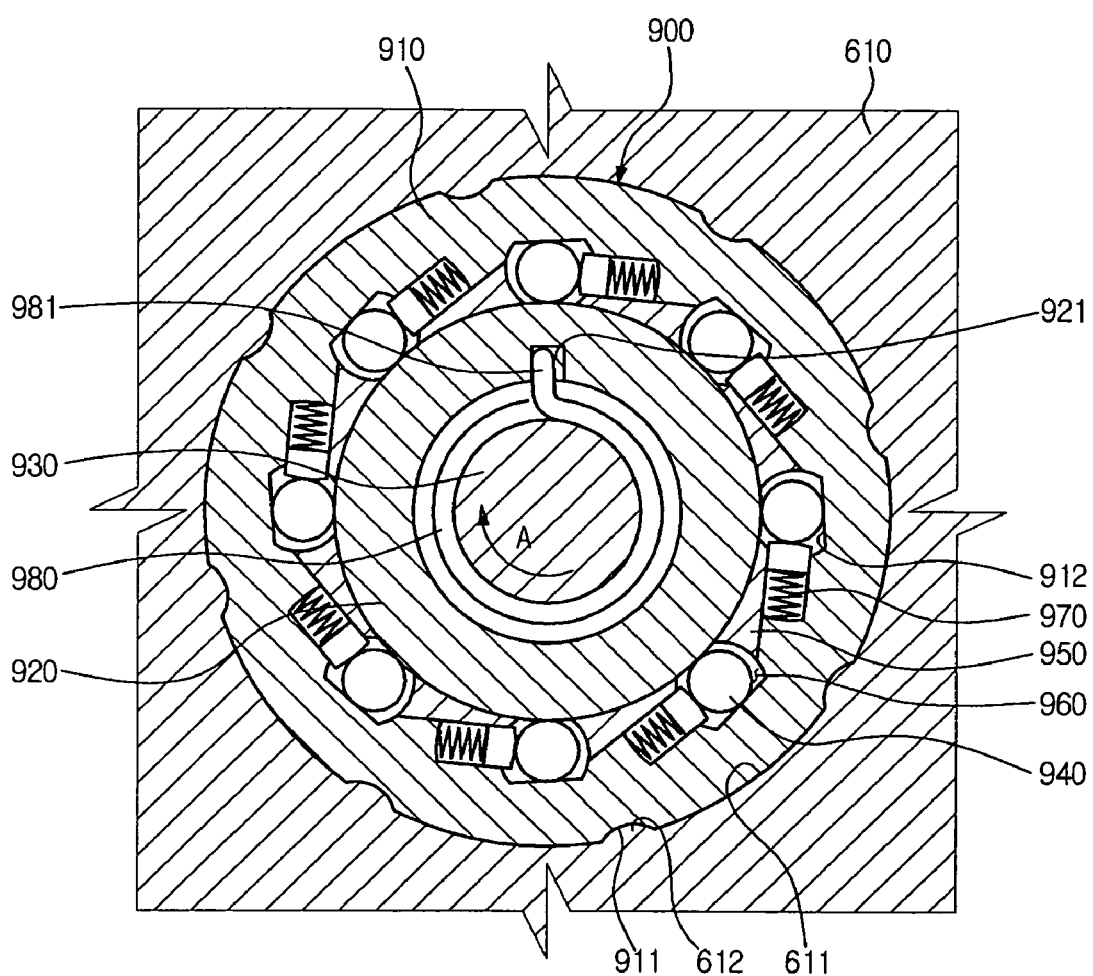
FIG. 4 is a view illustrating a torque limiter fixed to a first link member.

The torque limiter 900 to sense torque according to the reaction force of an object is connected to the first joint shaft 710a. FIG. 4 is a view illustrating an example of the torque limiter fixed to the first joint shaft.

As shown in FIG. 4, the first link member 610 is provided with an opening 611, one end of which is opened, and the torque limiter 900 is installed in the opening 611 of the first link member 610. A cover member (not shown) to prevent the separation of the torque limiter 900 from the first link member 610 may be connected to the opening 611.

The torque limiter 900 includes a housing 910 forming the external appearance of the torque limiter 900, a rotating member 920 formed in the housing 910, and a rotary shaft 930 extended through the housing 910 and the rotating member 920. The rotary shaft 930 is disposed coaxially with the first pulley 711. That is, the rotary shaft 930 is coaxial with the first joint shaft 710a provided with the first pulley 711.

A plurality of connection grooves 911, which is extended in the direction of the rotary shaft 930, is formed on the outer circumferential surface of the housing 910. Further, a plurality of connection ribs 612, which corresponds to the plurality of connection grooves 911 to prevent the relative rotation of the first link member 610 and the housing 910 to each other, is formed on the inner circumferential surface of the first link member 610.

A plurality of inclined planes 912, which is disposed at the same interval, is provided on the inner circumferential surface of the housing 910. Rollers 940 are respectively provided between the inclined planes 912 and the outer circumferential surface of the rotating member 920. The rollers 940 are respectively accommodated in pockets 960 formed in a cage 950 provided between the housing 910 and the rotating member 920. A pressure spring 970 to press each of the rollers 940 under the condition that each of the rollers 940 is locked between each of the inclined planes 912 and the outer circumferential surface of the rotating member 920 is provided at one side of each of the rollers 940.

One end of a coiled spring 980 is bent in a circle to connect the coil spring 980 to the rotating member 920, thus forming a bent piece 981. The bent piece 981 of the coiled spring 980 is engaged with a groove 921 formed on the inner circumferential surface of the rotating member 920. When the coiled spring 980 is expanded against the rotary shaft 930, the rotation of the rotary shaft 930 is transmitted to the rotating member 920 through the coiled spring 980. Further, the rotation of the rotating member 920 is transmitted to the housing 910 through the rollers 940.

In this state, when the first link member 610 contacts an object and thus the reaction force of the object is increased and the torque from the rotating member 920 to the housing 910 exceeds the elastic force of the pressure springs 970, the rollers 940 move to wide spaces formed between the inclined planes 912 and the cylindrical outer circumferential surface of the rotating member 920. Therefore, slippage is generated between the rotating member 920 and the rollers 940, and thus interrupts the transfer of the torque to the housing 910.

That is, the housing 910 fixed to the first link member 610 moves integrally with the first link member 610, and serves as a rotating factor to directly vary the bending angle of the first joint 710. Therefore, when the housing 910 is not rotated, the bending angle of the first joint 710 is not varied. That is, when torque of a designated value or more according to the reaction force of the object is applied to the first link member 610, the rotary shaft 930 runs idle and the first joint 710 is not bent.

Here, non-described reference numeral 740 represents bearings, which respectively fix joint shafts 710a, 720a, and 730a to designated positions and support the self weight of the joint shafts 710a, 720a, and 730a and loads applied to the joint shafts 710a, 720a, and 730a such that the joint shafts 710a, 720a, and 730a can be rotated.

The actuator 561 is installed in the base unit 560 adjacent to the first link member 610. The driving pulley 562 is rotatably fixed to the actuator 561. The driving pulley 562 is connected to the first pulley 711 of the first joint 710, and transmits the driving force of the actuator 561 to the first pulley 711.

The second joint 720 is a joint, which is closest to the base unit 560 after the first joint 710. The second link member 620 is connected to the first link member 610 through the second joint 720. The second joint 720 is freely bent, and the bending angle of the second joint 720 is varied according to the bending of the second joint 720 around the second joint shaft 720a. Here, non-described reference numeral 750 represents bearings.

A plurality of second pulleys 721R and 721L are connected to the second joint shaft 720a. That is, the second joint 720 includes the plurality of second pulleys 721R and 721L. The second pulleys 721R and 721L include a second pulley 721L formed at the left and a second pulley 721R formed at the right.

The second pulley 721R is fixed to the second link member 620. Further, the first power transmission member 820 connected to the first pulley 711 is wound on the second pulley 721R.

The second pulley 721L is fixed to the first link member 610. Further, a second power transmission member 830 connected to a third pulley 731 is wound on the second pulley 721L.

Here, the first power transmission member 820 and the second power transmission member 830 may be belts. Further, the first power transmission member 820 to connect the first pulley 711 and the second pulley 721R and the second power transmission member 830 to connect the second pulley 721L and the third pulley 731 are wound in different directions. That is, the second power transmission member 830 is wound in an X shape between the second pulley 721L and the third pulley 731, and thus the bending angle of the second joint 720 is varied while the second pulley 721L and the third pulley 731 are operated together.

The third joint 730 is a joint, which is closest to the tip of the finger. The third link member 630 is connected to the second link member 620 using the third joint 730.

The third link member 630 is provided with one end connected to the third joint 730 and the other end, which is a free terminal, i.e., the tip of the finger. The third link member 630 has an external appearance, which is approximately the same as that of the first link member 610. The third link member 630 is rotatably connected to the second link member 620 through the third joint 730.

The third joint 730 is freely bent, and the bending angle of the third joint 730 is varied according to the bending of the third joint 730 around the third joint shaft 730a.

The third pulley 731 is connected to the third joint shaft 730a. As described above, the second power transmission member 830 is wound on the third pulley 731, and thus is connected to the second pulley 721L.

Next, the operation of the robot hand in accordance with the embodiment of the present invention will be described.

Figure 5:
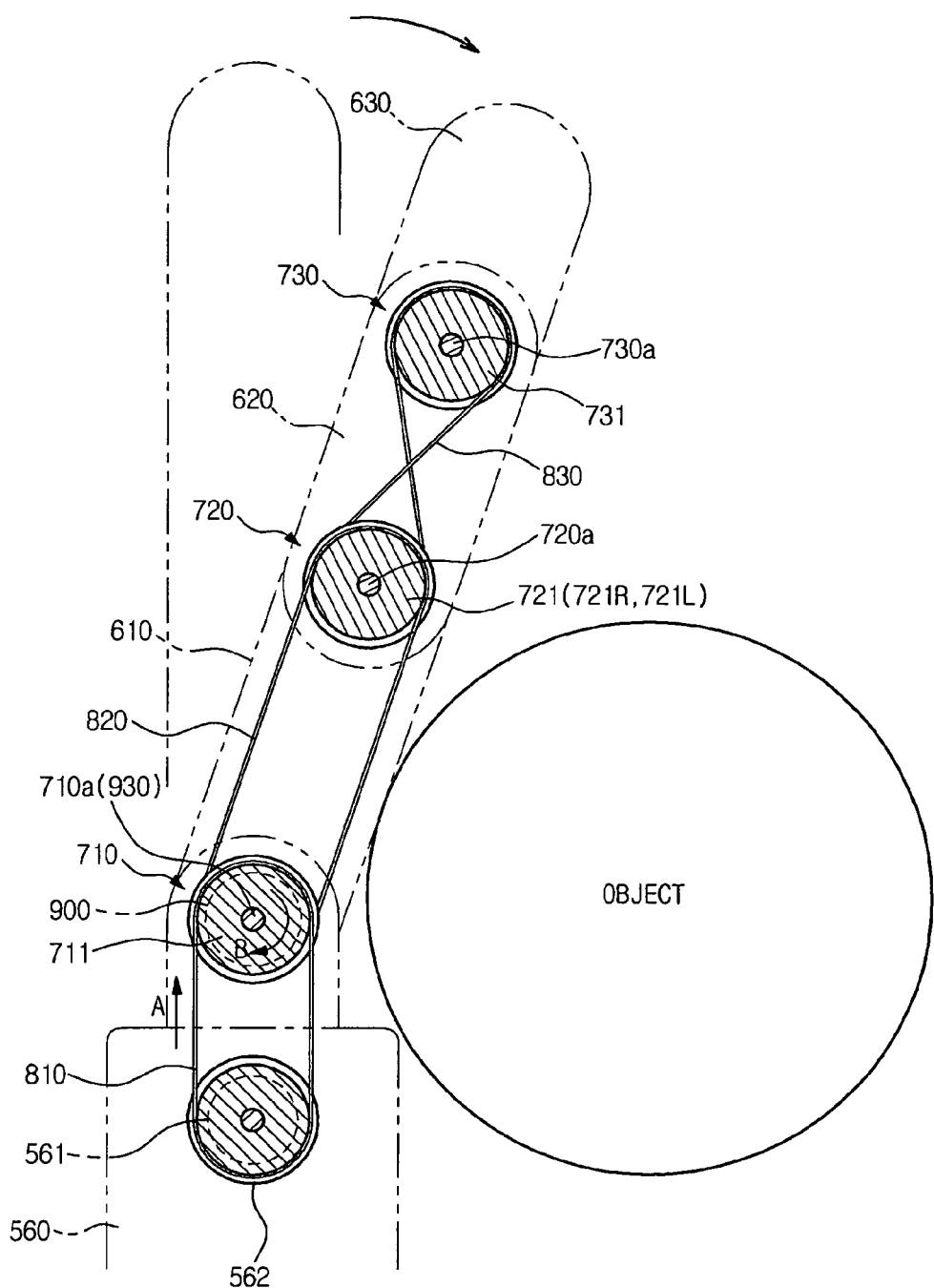
FIGS. 5 and 6 are views illustrating the operation of a finger unit in accordance with the embodiment.
Figure 6:
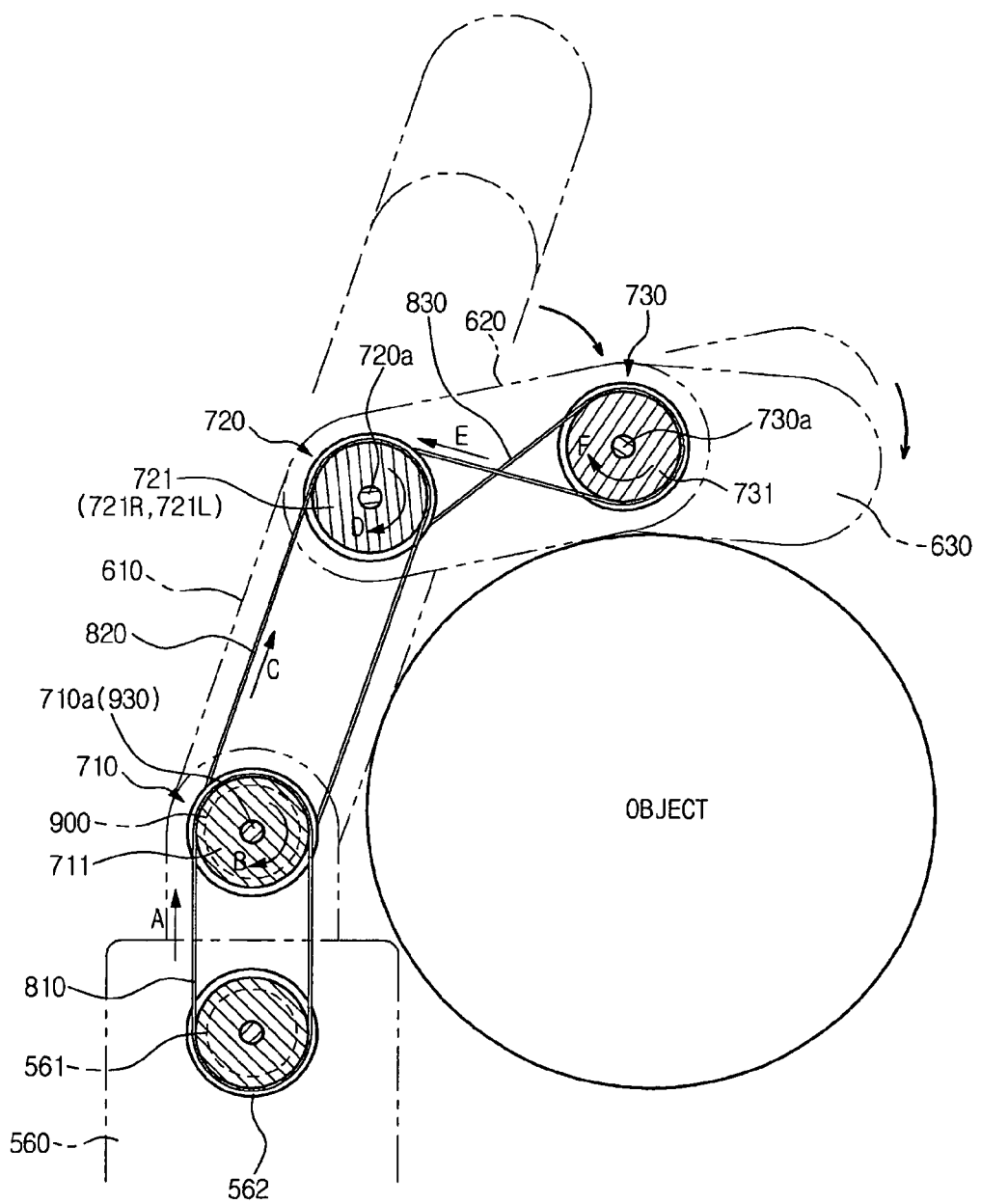

FIG. 5 is a view illustrating the state of the finger unit in accordance with the present invention, in which a motor is driven, and FIG. 6 is a view illustrating the state of the finger unit in accordance with the present invention, in which the bending angles of the joints are varied as an object contacts the link members.

As shown in FIGS. 5 and 6, when the actuator 561 installed in the base unit 560 moves the main pulley 562 and the main power transmission member 810 connected to the actuator 561 in the direction A, the first pulley 711 is rotated in the direction B, and the first joint 710 is bent toward the object in the direction B. At this time, since the first pulley 711 is not rotated against the first link member 610, the second link member 620 and the third link member 630 are arranged in a straight line with the first link member 610. That is, although the first pulley 711 is moved in the direction B, the first power transmission member 820 is not rotated but is relatively moved to maintain a straight line with the first link member 610.

Thereafter, when the bending angle of the first link member 610 is more varied and thus the first link member 610 contacts the object, the reaction force is applied to the first link member 610. Then, when torque of a designated value or more according to the reaction force is applied to the first link member 610, the first link member 610 is stopped by the operation of the torque limiter 900.

That is, when the first link member 610 contacts the object and the reaction force of the object is increased, slippage is generated between the torque limiter housing 910 and the rotary shaft 930 through the rotating member 920 and the rollers 940, and thus the rotating force of the rotary shaft 930 is not transmitted to the torque limiter housing 910. Therefore, the first link member 610 and the torque limiter housing 910 fixed to the first link member 610 maintain a stopped state regardless of the rotation of the rotary shaft 930 and the rotary shaft 930 and the first joint shaft 710a continuously run idle, and thus the first pulley 710 is continuously rotated in the direction B.

Thereafter, the first power transmission member 820 wound on the first pulley 711 is rotated in the direction C according to the rotation of the first pulley 711 in the direction B. Further, the second pulleys 721 are rotated in the direction D in the linkage with the rotation of the first power transmission member 820, the second link member 620 is relatively rotated against the first link member 610, and thus the bending angle of the second joint 720 is varied.

Further, the second power transmission member 830 wound on the second pulley 721L is rotated in the direction E according to the rotation of the second pulleys 721R in the direction D. Further, the third pulley 731 is rotated in the direction F in the linkage of the rotation of the second power transmission member 830, the third link member 630 is rotated, and thus the bending angle of the third joint 730 is varied.

As described above, although the above embodiment describes that the robot hand includes one thumb unit 510' and four finger units 510 and each of the finger units 510 includes three joints, the number of the finger units 510 and the number of the joints of each of the finger units 510 may be increased and decreased.

Further, the robot hand in accordance with the embodiment minimizes the number of actuators and adjusts the bending angles of the joints through torque limiters, thus being capable of flexibly and finely controlling the joints.

Although embodiments of the invention have been shown and described, it would be appreciated by those skilled in the art that changes may be made in these embodiments without departing from the principles and spirit of the invention, the scope of which is defined in the claims and their equivalents.

What is claimed is:
1. A robot hand comprising:
a base unit provided with an actuator;
at least one finger unit installed on the base unit;
a plurality of link members provided in each of the at least one finger units;
a plurality of joints connecting the plurality of link members;
a plurality of power transmission members linking the plurality of joints with each other by power transmitted from the actuator; and
a torque limiter disposed on any one joint of the plurality of joints, and restricting the bending of the any one joint to link another joint of the plurality of joints with the any one joint, the torque limiter including a housing fixed to any one link member of the plurality of link members which is connected to the any one joint, to adjust the bending angle of the any one joint,
wherein a plurality of grooves are formed on the outer circumferential surface of the housing, and
a plurality of ribs engaged with the plurality of grooves are formed on the inner circumferential surface of the any one link member to prevent the relative rotation of the any one link member against the housing.

2. The robot hand according to claim 1, wherein:
the plurality of link members include a first link member connected to the base unit, a second link member connected to the first link member, and a third link member connected to the second link member; and
the housing is fixed to the first link member.

3. The robot hand according to claim 2, wherein:
the plurality of joints includes a first joint connecting the base unit and the first link member, a second joint connecting the first link member and the second link member, and a third joint connecting the second link member and the third link member; and
the first, second, and third joints respectively include first, second, and third pulleys, and are linked with the actuator.

4. The robot hand according to claim 3, wherein the torque limiter includes a rotary shaft disposed coaxially with the first pulley.

5. The robot hand according to claim 3, wherein:
the plurality of power transmission members includes a first power transmission member connecting the first pulley and the second pulley, and a second power transmission member connecting the second pulley and the third pulley; and
the first power transmission member and the second power transmission member are wound in different directions.

6. The robot hand according to claim 5, wherein the second power transmission member is wound in an X shape formed between the second and third pulleys.

7. The robot hand according to claim 5, wherein the first and second power transmission members respectively include first and second belts.

8. A robot hand comprising:
a base unit provided with an actuator;
at least one finger unit installed on the base unit;
a plurality of link members provided in each of the at least one finger units, the plurality of link members including a first link member connected to the base unit, a second link member connected to the first link member, and a third link member connected to the second link member;
a plurality of joints connecting the plurality of link members, the plurality of joints including a first joint connecting the base unit and the first link member, a second joint connecting the first link member and the second link member, and a third joint connecting the second link member and the third link member, the first, second, and third joints respectively include first, second, and third pulleys, and are linked with the actuator;

a plurality of power transmission members linking the plurality of joints with each other by power transmitted from the actuator; and a torque limiter disposed on any one joint of the plurality of joints, and restricting the bending of the any one joint to link another joint of the plurality of joints with the any one joint, the torque limiter including a housing fixed to the first link member to adjust the bending angle of the any one joint, wherein when an object contacts the first link member and applies reaction force of a designated value or more to the first link member, the torque limiter is operated and thus the first link member is stopped, the rotary shaft is rotated in a slippage state with the housing, and thus the first pulley is rotated, the second pulley and the second link member are rotated in the linkage with the rotation of the first pulley, and thus the bending angle of the second joint is varied, and the third pulley and the third link member are rotated in the linkage with the rotation of the second link member, and thus the bending angle of the third joint is varied.

9. A humanoid robot having a torso and a robot hand connected to the torso, the robot hand comprising:

a base unit provided with an actuator;

at least one finger unit installed on the base unit, an actuator being provided on each of the at least one finger units;

a first link member, a second link member, and a third link member provided in each of the at least one finger units;

a first joint connecting the base unit and the first link member;

a second joint connecting the first link member and the second link member;

a third joint connecting the second link member and the third link member;

a first pulley provided on the first joint and receiving power of the actuator;

second pulleys provided on the second joint and connected to the first pulley;

a third pulley provided on the third joint and connected to the second pulleys;

a plurality of power transmission members linking the first, second, and third joints with each other by the power of the actuator; and a torque limiter disposed on the first joint, and restricting the bending of the first joint to rotate the second and third pulleys and thus to vary the bending angles of the second and third joints, when the torque limiter contacts an object and reaction force of a designated value or more is applied to the torque limiter, wherein a plurality of grooves is formed on the outer circumferential surface of the housing, and a plurality of ribs engaged with the plurality of grooves is formed on the inner circumferential surface of the first link member to prevent the relative rotation of the first link member against the housing.

10. The humanoid robot according to claim 9, wherein the torque limiter includes a housing fixed to the first link member to adjust the bending angle of the first joint.

11. The humanoid robot according to claim 9, wherein the torque limiter includes a rotary shaft disposed coaxially with the first pulley.

12. The humanoid robot according to claim 9, wherein:

the plurality of power transmission members includes a first power transmission member connecting the first and second pulleys, and a second power transmission member connecting the second and third pulleys; and the first power transmission member and the second power transmission member are wound in different directions.

13. The humanoid robot according to claim 9, wherein the second power transmission member is wound in an X shape between the second and third pulleys.

14. The humanoid robot according to claim 9, wherein the first and second power transmission members respectively include first and second belts.

15. A humanoid robot having a torso and a robot hand connected to the torso, the robot hand comprising:

a base unit provided with an actuator;

at least one finger unit installed on the base unit;

a first link member, a second link member, and a third link member provided in each of the at least one finger units;

a first joint connecting the base unit and the first link member;

a second joint connecting the first link member and the second link member;

a third joint connecting the second link member and the third link member;

a first pulley provided on the first joint and receiving power of the actuator;

second pulleys provided on the second joint and connected to the first pulley;

a third pulley provided on the third joint and connected to the second pulleys;

a plurality of power transmission members linking the first, second, and third joints with each other by the power of the actuator; and a torque limiter disposed on the first joint, and restricting the bending of the first joint to rotate the second and third pulleys and thus to vary the bending angles of the second and third joints, when the torque limiter contacts an object and reaction force of a designated value or more is applied to the torque limiter, the torque limiter including a rotary shaft disposed coaxially with the first pulley, wherein when an object contacts the first link member and applies reaction force of a designated value or more to the first link member, the torque limiter is operated and thus the first link member is stopped, the rotary shaft is rotated in a slippage state with the housing, and thus the first pulley is rotated, the second pulley and the second link member are rotated in the linkage with the rotation of the first pulley, and thus the bending angle of the second joint is varied, and the third pulley and the third link member are rotated in the linkage with the rotation of the second link member, and thus the bending angle of the third joint is varied.

* * * * *